United States Patent [19]
Horstkorte et al.

[11] 3,941,737
[45] Mar. 2, 1976

[54] PVC PLASTISOLS CONTAINING INORGANIC PEROXIDES

[75] Inventors: Helmut Horstkorte, Monheim-Baumberg; Wilhelm Clas, Duisburg-Meiderich, both of Germany

[73] Assignee: Henkel & Cie G.m.b.H., Dusseldorf-Holthausen, Germany

[22] Filed: May 30, 1974

[21] Appl. No.: 474,606

[30] Foreign Application Priority Data
June 1, 1973 Germany............................ 2327957

[52] U.S. Cl....... 260/30.6 R; 260/30.8 R; 260/31.6; 260/31.8 R; 260/42.49; 260/884; 260/885
[51] Int. Cl.².......................................... C08K 5/49
[58] Field of Search.. 260/873, 899, 30.6 R, 31.8 R, 260/30.8, 884

[56] References Cited
UNITED STATES PATENTS

| | | | |
|---|---|---|---|
| 3,280,067 | 10/1966 | Anagnostopoulos....... | 260/31.8 R X |
| 3,414,534 | 12/1968 | Huitson et al.................. | 260/873 X |
| 3,557,256 | 1/1971 | Muskat..................... | 260/31.8 R X |

*Primary Examiner*—Lewis T. Jacobs
*Attorney, Agent, or Firm*—Hammond & Littell

[57] ABSTRACT

Plastisols based upon plasticizable polyvinyl chloride, or co-polymers of vinyl chloride, and plasticizers, as well as a content of polymerizable esters of $\alpha,\beta$-unsaturated carboxylic acids and polyhydroxy alcohols, and solid inorganic percompounds, which can be used for the production of firmly adhering coatings and adhesives.

7 Claims, No Drawings

3,941,737

PVC PLASTISOLS CONTAINING INORGANIC PEROXIDES

THE PRIOR ART

Plastisols based upon PVC and plasticizers for PVC are used to a large extent as coating materials for metals and other substrates, as well as being used as adhesives. One difficulty in the use of these plastisols is that the metals or other substrates for the coating or bonding agent must pass through certain cleaning processes. Therefore it has been attempted to improve the adhesion also on uncleaned or non-pretreated supports by additives to the plastisols themselves. Examples of suitable additives for improved adhesion include ethyleneglycol-dimethacrylate or also the acrylic and-/or methacrylic acid esters of polyhydroxy alcohols such as for example trimethylol-propane-pentaerythrite or sorbitol. For these additives to become effective, however, it is necessary to add organic peroxides or hydroperoxides, such as cumolhydroperoxide, t-butyl-hydroperoxide, diisopropylbenzene-hydroperoxide or t-butyl-permaleinate, cyclohexanone peroxide or the like.

A disadvantage in using the combination of acrylic acid or methacrylic acid ester of polyhydroxy alcohols with inorganic peroxides is that the polymerization can readily be brought about at temperatures slightly above room temperature. These additives thus become ineffective and the plastisol may also become so highly viscous that it cannot be processed any more.

OBJECTS OF THE INVENTION

It is an object of the present invention to provide plastisols based on plasticizable polyvinyl chloride, or copolymers of vinyl chloride, and plasticizers, as well as a content of polymerizable esters of $\alpha,\beta$-unsaturated carboxylic acids and polyhydroxy alcohols and solid inorganic percompounds, which can be used for the production of firmly adhering coatings and adhesives.

It is another object of the present invention to provide a PVC plastisol comprising A. from 10 to 50% by weight of a plasticizable polymer selected from the group consisting of polyvinyl chloride and copolymers of from 80 to 100% by weight of vinyl chloride and from 0 to 20% by weight of ethylenically-unsaturated monomers copolymerizable with vinyl chloride, B. from 6 to 60% by weight of a plasticizer for polyvinyl chloride, wherein the ratio of component A to component B is from 1:0.6 to 1:2, C. from 1 to 20% by weight of an ester of an $\alpha,\beta$-unsaturated carboxylic acid having from 3 to 8 carbon atoms and at least one carboxyl group, with an aliphatic polyhydroxy alcohols, with the proviso that at least two olefinic bonds are present in said ester, D. from 0.1 to 6% by weight of a solid inorganic percompound, and E. from 0 to 70% by weight of inert material selected from the group consisting of inorganic fillers and mineral pigments.

These and further objects of the present invention will become apparent as the description thereof proceeds.

DESCRIPTION OF THE INVENTION

The disadvantages of the prior art described above can be avoided by adding to the plastisols, solid inorganic percompounds instead of the commonly used organic hydroperoxides and/or peroxides.

The present invention relates to plastisols based upon plasticizable polyvinyl chloride, or co-polymers of vinyl chloride and plasticizers, as well as a content of polymerizable esters of $\alpha,\beta$-unsaturated carboxylic acids and polyhydroxy alcohols and solid inorganic percompounds, which can be used for the production of firmly adhering coatings and adhesives.

More particularly the present invention provides a PVC plastisol comprising

A. from 10 to 50% by weight of a plasticizable polymer selected from the group consisting of polyvinyl chloride and copolymers of from 80 to 100% by weight of vinyl chloride and from 0 to 20% by weight of ethylenically-unsaturated monomers copolymerizable with vinyl chloride, B. from 6 to 60% by weight of a plasticizer for polyvinyl chloride, wherein the ratio of component A to component B is from 1:0.6 to 1:2, C. from 1 to 20% by weight of an ester of an $\alpha,\beta$-unsaturated carboxylic acid having from 3 to 8 carbon atoms and at least one carboxyl group, with an aliphatic polyhydroxy alcohol, with the proviso that at least two olefinic bonds are present in said ester, D. from 0.1 to 6% by weight of a solid inorganic percompound, and E. from 0 to 70% by weight of inert material selected from the group consisting of inorganic fillers and mineral pigments.

The present invention is further directed to providing an improvement in the process for producing a coated article which comprises applying a PVC plastisol to a substrate, heating said coated substrate to a temperature and for a time effective to gel said plastisol and to produce said coated article, and recovering said coated article; wherein the improvement comprises utilizing the above-described plastisol, as said plastisol.

The present invention further provides an improvement in a PVC plastisol comprising A. a plasticizable polymer selected from the group consisting of polyvinyl chloride and copolymers of from 80 to 100% by weight of vinyl chloride and from 0 to 20% by weight of ethylenically-unsaturated monomers copolymerizable with vinyl chloride, B. a plasticizer for polyvinyl chloride, wherein the ratio of component A to component B is from 1:0.6 to 1:2, C. an ester of an $\alpha,\beta$-unsaturated carboxylic acid having from 3 to 8 carbon atoms and at least one carboxyl group, with an aliphatic polyhydroxy alcohol, with the proviso that at least two olefinic bonds are present in said ester, and D. an effective amount of a percompound, wherein the improvement comprises utilizing in (D) from 0.1 to 6% by weight of a solid inorganic percompound, as said effective amount of a percompound.

Suitable examples of solid inorganic percompounds include primarily alkaline earth metal peroxides such as the peroxides of barium and calcium. Suitable also are alkali metal perhydrates, such as alkali metal perborates, for example sodium perborates, such as sodium perborate tetrahydrate or sodium perborate monohydrate ($NaBO_2.H_2O_2.3H_2O$ and $NaBO_2.H_2O_2$), perborax ($Na_2B_4O_4.4H_2O_2$) or else perhydrates such as peroxycarbonates, for example, alkali metal percarbonates such as $Na_2CO_3.1.5H_2O_2$. Also suitable are alkali metal permanganates such as potassium permanganate KMnO₄ alkali metal perchlorates such as potassium perchlorate KClO₄, and alkali metal persulfates such as sodium persulfate Na₂S₂O₈.

Mixtures of the inorganic percompounds may be utilized. Lastly it is possible to use peroxypyrophosphates or to use the salts of Caro's acid, for example, potassium persulfate (KHSO₅). The amount of inorganic percompounds should usually be from 0.1 to 6% by weight, preferably from 0.2 to 4% by weight of the total amount of the plastisol.

The plastisols according to the present invention have the advantages that the shelf life of the plastisols produced with said solid inorganic percompounds is excellent and is usually more than one year under normal storage conditions. Under certain conditions, however, it may be expedient also, in order to further improve the storage stability and, as well as to preserve the activity of the percompounds, to use stabilizers for the percompounds as well. These stabilizers may, for example, be magnesium silicates, cadmium silicates or tin silicates. Such stabilizers as magnesium silicate may be used simultaneously as a filler.

Suitable examples of esters of α,β-unsaturated carboxylic acids of 3 to 8 carbon atoms and at least one carboxyl group with polyhydroxy alcohols include esters of alkenoic acids having 3 to 8 carbon atoms with alkanediols having 2 to 8 carbon atoms or alkanetriols having 3 to 8 carbon atoms, or polyoxy-lower alkylene glycols having 4 to 12 carbon atoms, such as methacrylic acid esters or acrylic acid esters of ethylene glycol, diethylene glycol, triethylene glycol, and trimethylol propane. Suitable also are esters of alkenedioic acids havin 3 to 8 carbon atoms such as esters of maleic acid, fumaric acid or itaconic acid with said alcohols; and in the latter case it is possible to also use in the esterification, monoalcohols such as alkanols having 2 to 6 carbon atoms for example, propanol, butanol and the like. Also the so-called unsaturated poly-esters are accordingly useful for the plastisols of the invention, although the known methacrylic acid esters and acrylic acid esters are preferred. The ratio of plastisol to the esters of α,β-unsaturated carboxylic acids should be such that there is about 1 to 20% by weight, more particularly 2 to 10% by weight, of the ester present in the total plastisol.

The PVC plastisol contains from 10 to 50% by weight of a plasticizable polymers. For the production of the plastisols of the invention it is possible to employ all of the known plasticizable polymers. These polymers should have a K value of about 50 to 80. Besides PVC itself, it is possible to use copolymers of from 80 to 100% by weight of vinyl chloride and from 0 to 20% by weight of ethlenically-unsaturated monomers copolymerizable with vinyl chloride.

Examples of suitable plasticizable powders include copolymer of vinyl chloride, for example, with vinylidene chloride or with alkyl esters of alkenoic acids having 3 to 8 carbon atoms such as acrylic acid or methacrylic acid esters, or with vinyl esters of alkanoic acids having 2 to 22 carbon atoms such as vinyl acetate or vinyl propionate or also with vinyl esters of higher fatty acids. Also suitable are unsaturated carboxylic acids or their anhydrides which may be used in small quantity in the production of the plasticizable copolymerizates of vinyl chloride. Suitable examples of unsaturated carboxylic acids are for example alkenoic acids having 3 to 8 carbon atoms such as acrylic acid, methacrylic acid and/or crotonic acid; as well as alkenedioic acids having 4 to 8 carbon atoms such as maleic acid, itaconic acid and/or fumaric acid, and mixtures of these acids.

The plastisols according to the invention contain the usual plasticizers for polyvinyl chloride in an amount from 6 to 60% by weight, preferably 15 to 40% by weight. There enter into consideration, for example, the esters of phthalic acid with cycloalkanols of 5 to 7 carbon atoms such as dicyclohexyl phthalate, or the esters of phthalic acid with alkanols of 4 to 16 carbon atoms such as dibutyl phthalate, dioctyl phthalate, diethylhexyl phthalate, didecyl phthalate or mixed esters of phthalic acid with said alcohols such as octyldecyl phthalate. Also suitable as plasticizers are sulfonic acids esters of aromatic alcohols, such as octadecylsulfonic acids esters of cresol or phenol, more particularly technical mixtures of $C_{14}$ to $C_{16}$ alkylsulfonic acid esters of cresols or phenol. Also suitable are phosphoric acid esters of aromatic alcohols, such as tricresyl phosphate. Also suitable are adipic acid or sebacic acid esters of alcohols of medium chain length such as alkanols having 4 to 10 carbon atoms, for instance butanol, octanol or decanol. In some cases it is desirable if the plastisols contain in addition to the above types of plasticizers, the so-called polymeric plasticizers, which can be obtained by esterification of polyhydroxy alcohols with polycarboxy carboxylic acids. In many cases it is advisable to add to the plastisols of the invention stabilizers againt aging. These may be lead carbonate, lead sulfate, lead phosphite or lead phthalate. Preferred is the use of epoxide stabilizers, as for example, epoxidized linseed oil, epoxidized soybean oil or epoxidized esters of oleic acid or alkyl esters of epoxidized soybean fatty acid, such as the ethylhexyl ester of epoxidized soybean fatty acid.

The weight ratio of the plasticizable polymer to the plasticizer for polyvinyl chloride is preferably from 1:0.6 to 1:2.

In addition to said compounds the plastisols according to the invention can also contain advantageously mineral pigments or inorganic fillers in an amount from 0 to 70% by weight. Suitable inorganic fillers are, for example, chalk, barium sulfate, talc, ground alumina, dolomite and the like. Suitable mineral pigments are titanium oxide, iron oxide, copper phthalocyanin, carbon black and red iron oxide.

The plastisols of the invention can be applied onto the materials to be coated or to be bonded, in known manner, and can be caused to gel by heating to temperatures of about 150° to 200° C. The heating time depends, of course, on the required temperature and is between about 5 minutes to 1 hour. Generally, at medium temperatures of 160° to 180°C, a gelling time of 15 to 20 minutes is sufficient to produce a firm adhesion on steel plates, phosphatized steel plate and metals pretreated by electrocoating.

In addition, firmly adhering coatings can be applied onto various other, particularly metallic, materials such as zinc, aluminum, chromium, vanadium, titanium as well as alloys of said metals, or onto ceramic parts, natural stones, concrete parts, mineral fibers and the like.

The coatings that can be produced with the plastisols of the invention have a firm adhesion on a variety of substrates. It is therefore generally not necessary to carry out an especially careful cleaning of the substrate beforehand. In principle all materials can be coated or bonded with the plastisols of the invention if they are able to withstand the temperature reuired for the gelling of the plastisol.

The following examples are merely illustrative of the present invention without being deemed limitative in any manner thereof.

EXAMPLE 1

In a kneader, a plastisol was prepared by mixing the following components:
- 150 gm of Polyvinyl chloride (K value 70)
- 400 gm of Chalk ($CaCO_3$)
- 217 gm of Barium sulfate
- 120 gm of 2-ethylhexyl ester of epoxidized soybean fatty acid
- 80 gm of Technical mixture of $C_{14}$ to $C_{16}$ alkylsulfonic acid ester of cresol (commercial)
- 30 gm of Trimethylolpropane trimethacrylate
- 3 gm of Barium peroxide.

With this prepared plastisols, sheets of untreated steel, phosphatized steel, and steel pretreated by the electrocoating process were coated. For this purpose the plastisol was gelled for 20 minutes at 170° C (object temperature). Firmly adhering coatings were produced, which could be separated from the sheet only under material failure.

The plastisol obtained was stored for 6 months at an average room temperature of about 23° C. It showed no viscosity increase, and there was no decrease in adhesivity. Also after it had been stored for 72 hours at 40° C, a viscosity increase of only 18% was observed. The plastisol showed the same firm adhesion properties as the freshly prepared mixture.

EXAMPLE 2

Using a procedure analogous to that of Example 1, a plastisol was prepared in a kneader, except that instead of using barium peroxide,
- (a) 2 gm of $NaBO_2.H_2O_2$ was used, or
- (b) 2 gm of $Na_2CO_3. 1.5\ H_2O_2$ was used.

Then with each plastisol (a) and (b) firmly adhering coatings were produced on sheets of untreated steel and phosphatized steel at 170° C object temperature by gelling for 20 minutes. The plastisol showed practically the same viscosity behavoir and adhesion behavior as that described in Example 1.

EXAMPLE 3

In a kneader, a plastisol was prepared by mixing the following components:
- 150 gm of Polyvinyl chloride (K value 70)
- 400 gm of Chalk ($CaCO_3$)
- 217 gm of Barium sulfate
- 100 gm of epoxidized linseed oil (8.2% epoxide oxygen) and
- 20 gm of di-ethylhexyl phthalate
- 80 gm of Technical mixture of $C_{14}$ to $C_{16}$ alkylsulfonic acid ester of cresol (commercial)
- 30 gm of Trimethylolpropane trimethacrylate
- 3 gm of Barium peroxide.

With this prepared plastisol, sheets of brass and untreated steel (V2A) were coated. For this purpose the plastisol was gelled for 20 minutes at 165° C (object temperature). Firmly adhering coatings were produced, which could be separated from the sheet only under material failure. The storage capabilities of the plastisol were compatible to those of Example 1.

EXAMPLE 4

Utilizing a procedure analogous to that of Example 1, a plastisol was prepared in a kneader, except that instead of using barium peroxide.
- (a) 2 gm of $KMnO_4$ was used,
- (b) 2.5 gm of $KClO_4$, was used, or
- (c) 3 gm of $Na_2S_2O_8$ was used.

With each plastisol (a), (b) and (c) firmly adhering coatings were produced on sheets of untreated steel, phosphatized steel and an aluminum alloy according to DIN 1783 (Al/Cu/Mg/2BLF-43). DIN is the abbreviation for "Deutsche Industrie-Norm" representing a series of standard German published test procedures. Each plastisol (a), (b) and (c) was gelled for 20 minutes at 165° C. Each plastisol showed practically the same storage capabilities and adhesion behavior as that described in Example 1.

EXAMPLE 5

In a kneader, a plastisol was prepared by mixing the following components:
- 30 gm of a mixed polymerizate of 86% vinyl chloride and 14% vinylidene chloride (K-value 48)
- 120 gm of PVC (K-value 74)
- 400 gm of Chalk ($CaCO_3$)
- 217 gm of Barium sulfate
- 100 gm of epoxidized linseed oil (8.2% epoxide oxygen) and
- 20 gm of di-ethylhexyl phthalate
- 80 gm of Technical mixture of $C_{14}$ to $C_{16}$ alkylsulfonic acid ester of cresol (commercial)
- 30 gm of Trimethylolpropane trimethacrylate
- 3 gm of Barium peroxide.

With this prepared plastisol, sheets of the above aluminum alloy according to DIN 1783, untreated steel (V2A), and steel pretreated by electrocoating, were coated. For this purpose the plastisol was gelled for 20 minutes at 170° C (object temperature). Firmly adhering coatings were produced, which could be separated from the sheet only under material failure. The storage capabilities of the plastisol were comparable to that of Example 1.

Although the present invention had been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. A PVC plastisol comprising
   A. from 10 to 50% by weight of a plasticizable polymer selected from the group consisting of polyvinyl chloride and copolymers of vinyl chloride with up to 20% by weight of ethylenically unsaturated monomers copolymerizable with vinyl chloride,
   B. from 6 to 60% by weight of a plasticizers for polyvinyl chloride, wherein the ratio of component A to component B is from 1:0.6 to 1:2,
   C. from 1 to 20% by weight of an ester of an $\alpha,\beta$-unsaturated carboxylic acid having from 3 to 8 carbon atoms and at least one carboxyl group with an aliphatic polyhydroxy alcohol, with the proviso that at least two olefinic bonds are present in said ester, D. from 0.1 to 6% by weight of a solid inorganic percompound selected from the group consisting of an alkaline earth metal peroxide, an alkali metal peroxycarbonate, an alkali metal perborate, an alkali metal permanganate, alkali metal perchlorate, alkali metal persulfate and the mixtures thereof, and E. from 0 to 70% by weight of inert material selected from the group consisting of inorganic fillers and mineral pigments.

2. The plastisol of claim 1, wherein there is from 0.2 to 4% by weight of said solid inorganic percompound.

3. The plastisol of claim 1, wherein said solid inorganic percompound is selected from the group consisting of barium peroxide, potassium permanganate, potassium perchlorate, sodium persulfate, sodium percarbonate, sodium perborate and the mixtures thereof.

4. The plastisol of claim 1, wherein there is from 2% to 10% by weight of said ester of an $\alpha,\beta$-unsaturated carboxylic acid with a polyhydroxy alcohol.

5. The plastisol of claim 1, wherein said ester of an $\alpha,\beta$-unsaturated carboxylic acid is selected from the group consisting of esters of alkenoic acids having 3 to 8 carbon atoms with alkanediols having 2 to 8 carbon atoms, esters of alkenoic acids having 3 to 8 carbon atoms with alkanetriols having 3 to 8 carbon atoms, ester of alkenoic acids having 3 to 8 carbon atoms with polyoxy-lower alkylene glycols having 4 to 12 carbon atoms, esters of alkenedioic acids having 3 to 8 carbon atoms with alkanediols having 2 to 8 carbon atoms, and alkenedioic acids having 3 to 8 carbon atoms with alkanetriols having 3 to 8 carbon atoms.

6. The plastisol of claim 1, wherein there is from 15 to 40% by weight of said plasticizer.

7. In a PVC plastisol comprising

A. a plasticizable polymer selected from the group consisting of polyvinyl chloride and copolymers of vinyl chloride with up to 20% by weight of ethylenically unsaturated monomers copolymerizable with vinyl chloride, B. a plasticizer for polyvinyl chloride, wherein the ratio of component A to component B is from 1:0.6 to 1:2, C. an ester of an $\alpha,\beta$-unsaturated carboxylic acid having from 3 to 8 carbon atoms and at least one carboxyl group, with an aliphatic polyhydroxy alcohol, with the proviso that at least two olefinic bonds are present in said ester, and D. an effective amount of a percompound, and the improvement which comprises utilizing in (D) from 0.1 to 6% by weight of a solid inorganic percompound selected from the group consisting of an alkaline earth metal peroxide, an alkali metal peroxycarbonate, an alkali metal perborate, an alkali metal permanganate, alkali metal perchlorate, alkali metal persulfate and the mixtures thereof, as said effective amount of a percompound.

* * * * *